United States Patent [19]

Johnson

[11] 3,826,863

[45] July 30, 1974

[54] SUBSCRIPTION TELEVISION SYSTEM USING AUDIO AND VIDEO CARRIER REVERSAL

[75] Inventor: Arthur R. Johnson, Des Plaines, Ill.

[73] Assignee: Oak Industries Inc., Crystal Lake, Ill.

[22] Filed: Feb. 9, 1973

[21] Appl. No.: 331,092

[52] U.S. Cl. .................................... 178/5.1, 325/33

[51] Int. Cl. ............................................ H04n 1/44

[58] Field of Search ......................... 178/5.1; 325/33

[56] References Cited

UNITED STATES PATENTS

| | | | |
|---|---|---|---|
| 3,054,857 | 9/1962 | Weiss | 178/5.1 |
| 3,527,877 | 9/1970 | Walker | 178/5.1 |
| 3,730,980 | 5/1973 | Kirk, Jr. | 178/5.1 |
| 3,769,448 | 10/1973 | Court | 178/5.1 |

*Primary Examiner*—T. H. Tubbesing
*Assistant Examiner*—S. C. Buczinski
*Attorney, Agent, or Firm*—Kinzer, Plyer, Dorn & McEachran

[57] ABSTRACT

A subscription television system reverses the audio and video carriers within a particular channel on a random basis. A switching signal, nominally one Mhz beneath the video carrier, is transmitted to each of the receivers for use in effecting decoding at each receiver location.

5 Claims, 3 Drawing Figures

SUBSCRIPTION TELEVISION SYSTEM USING AUDIO AND VIDEO CARRIER REVERSAL

SUMMARY OF THE INVENTION

The present invention relates to a subscription television system and in particular to a system in which the audio and video carriers in a particular channel are periodically and randomly reversed to provide security for the system.

Another purpose is a subscription television system of the type described in which the switching signal is transmitted within the band of the particular channel and preferably about one Mhz below the video carrier.

Another purpose is a simply constructed reliably operable subscription television system of the type described.

Another purpose is a subscription television system utilizing a reversal of the audio and video carriers on a controlled basis within the channel.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Basically, the invention provides for random switching of the video and audio carriers within a single television channel to prevent unauthorized reception of these signals in a manner to be useful. Prior scrambling methods in this general field have contemplated switching signals between adjacent channels and between separated channels. However, the disadvantage of such arrangements is that more than one channel of the limited number of TV channels available must be utilized to provide a single subscription channel. The present invention provides security within a single channel and does so without disturbing adjacent channels. Thus, in a cable television system there may be one or more subscription channels intermingled with non-subscription channels without any interference on the part of either. In addition, at the receiver location the normal cable television converter may be simply modified, either internally or with the addition of a small external unit to receive the subscription channel.

Figure 1:
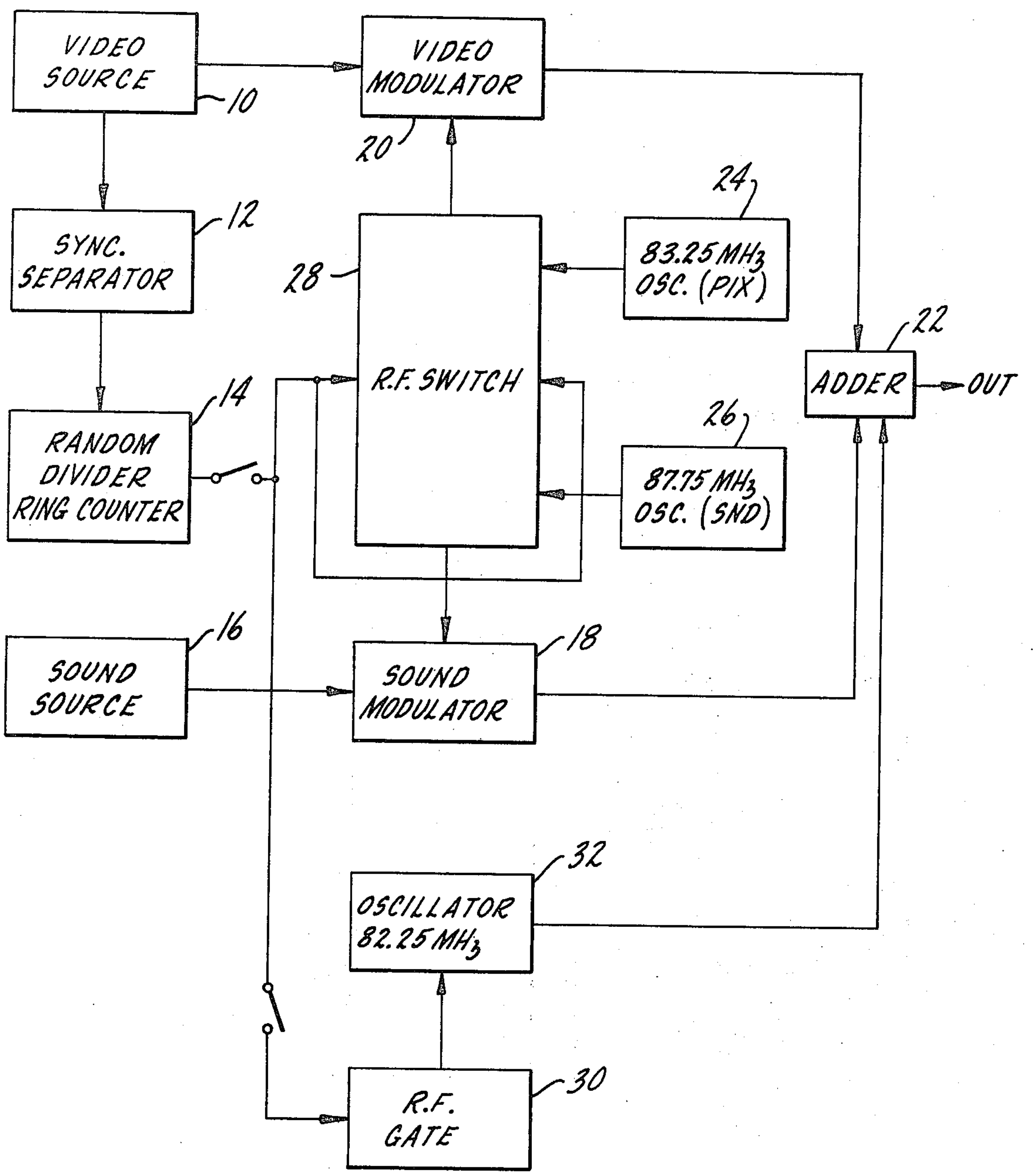
FIG. 1 is a block diagram illustrating the transmitting portion of the subscription TV system described herein.

FIG. 1 illustrates the details of the equipment at the television transmitting station. The invention will be described using channel 6 as the subscription channel, but quite obviously the invention should not be so limited and any convenient channel may be used as the subscription channel.

A source of video is indicated at 10 and is connected to a sync separator 12. The output of the sync separator 12 will be the vertical sync pulses from the video source and the video sync pulses are directed to a random divide ring counter 14. The output of the ring counter 14 will be successive sync pulses which may be separated in time anywhere from ⅛ second to 2 seconds. The output, as the name indicates, is on a random basis to prevent an unauthorized user from decoding the switching audio and video.

A sound or audio source is indicated at 16 and is connected to a sound modulator 18. In like manner, the video source 10 is connected to a video modulator 20. The output from both the audio and video modulators is directed to an adder 22 which directs the composite signal out onto the cable. A video carrier oscillator is indicated at 24 and an audio carrier oscillator is indicated at 26. The video carrier oscillator, again assuming channel 6 as the channel being used on a subscription basis, will have a frequency of 83.25 Mhz and the audio carrier oscillator will operate at a frequency of 87.75 Mhz. Both the oscillators 24 and 26 are connected to an RF switch 28 as is the output from the counter 14.

An RF gate is indicated at 30 and is connected to a switching oscillator 32 operating at a frequency of 82.25 Mhz or 1 Mhz beneath the video carrier frequency. The output from the oscillator 32, gated RF pulses at 82.25 Mhz, is also directed to the adder 22 for transmission of the cable.

In operation, the audio and video carrier oscillator will be randomly switched, by the RF switch 28, between the audio and video modulators. For example, during a first interval the video signal may be modulated by the normal video carrier and the audio signal by the normal audio carrier. After a switching pulse from the counter 14, the carriers are reversed and at every succeeding pulse from the counter 14 the carriers will be reversed. Each time there is switching between the audio and video carriers, the RF gate 30 receives the same switching pulse as does the RF switch 28. Thus, the switching signal from oscillator 32 will be transmitted simultaneously with the switching of the audio and video carriers for use by the receiving locations to decode the picture and sound information.

Figure 2:
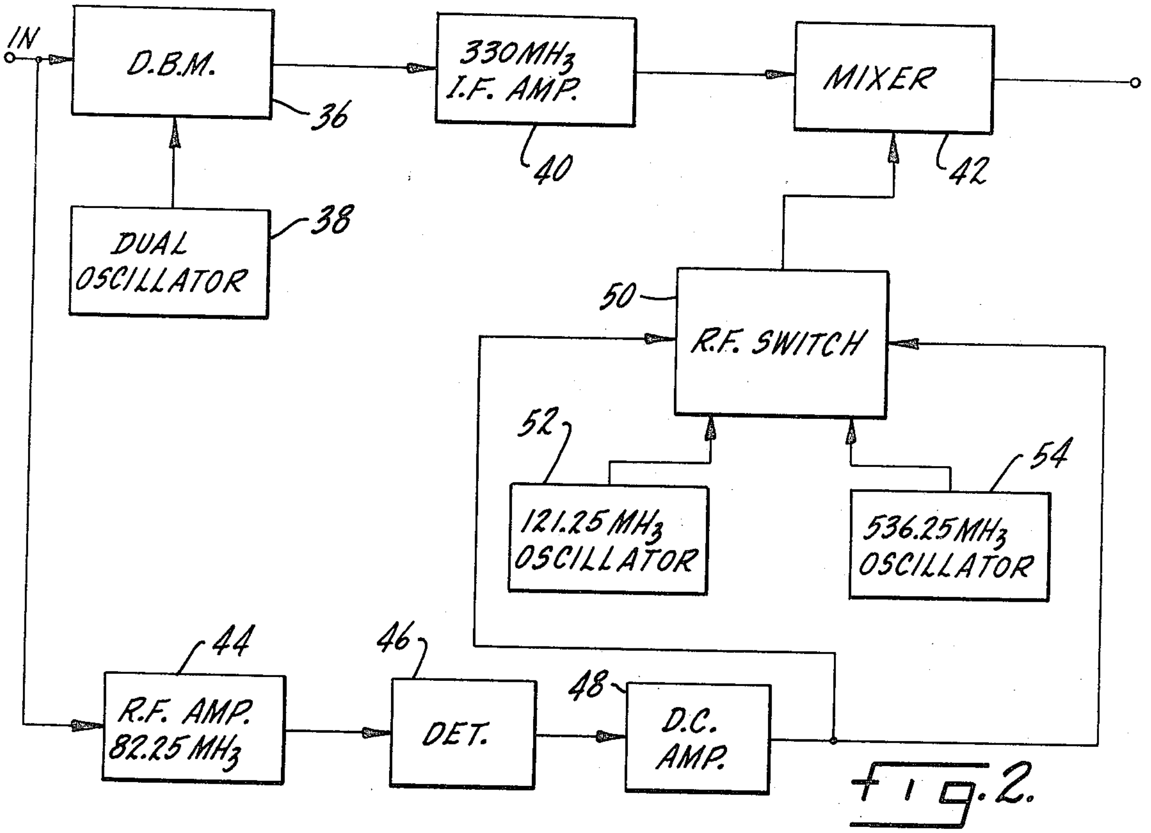
FIG. 2 is a block diagram illustrating a typical receiver location.

FIG. 2 illustrates the equipment necessary at the receiver location. A conventional cable converter may be modified, or a small additional unit may be added. The converter cable may be a double balanced mixer 36 which receives both the cable input and a signal from oscillator 38 which may be a dual oscillator of the type used in cable converters manufactured by Oak Industries Inc. of Crystal Lake, Ill. The output from the mixer 36 is directed to an IF amplifier 40 whose output is directed to a second mixer 42. From mixer 42 the signal will be directed to the local television receiver.

The additional equipment necessary to decode the scrambled audio and video includes an RF amplifier 44 connected to the cable input and tuned to 82.25 Mhz, or the frequency of the switching signal. A detector 46 and a DC amplifier 48 are sequentially connected to the RF amplifier 44 with the result that the output of the DC amplifier 48 will be a changing DC voltage which is directed to an electronic switch 50. Connected to the switch 50 are two oscillators indicated at 52 and 54, oscillator 52 having a frequency of 121.25 Mhz and oscillator 54 having a frequency of 536.25 Mhz. The 536.25 Mhz oscillator inverts the video and sound carriers because it is above the IF frequency, while the 121.25 Mhz does not invert the video and sound carriers because it is below the IF frequency.

In operation the RF switch 50 will operate in conjunction with the audio and video carrier switching at the transmitting location so that mixer 42 will receive the appropriate oscillator frequency to decode the audio and video signals. Every time the audio and video carriers are switched there will be an essentially simultaneous switching at each receiver location so that the appropriate oscillator is connected to the mixer 42 to change the signal from the IF amplifier to a frequency suitable for use in a TV receiver.

Figure 3:
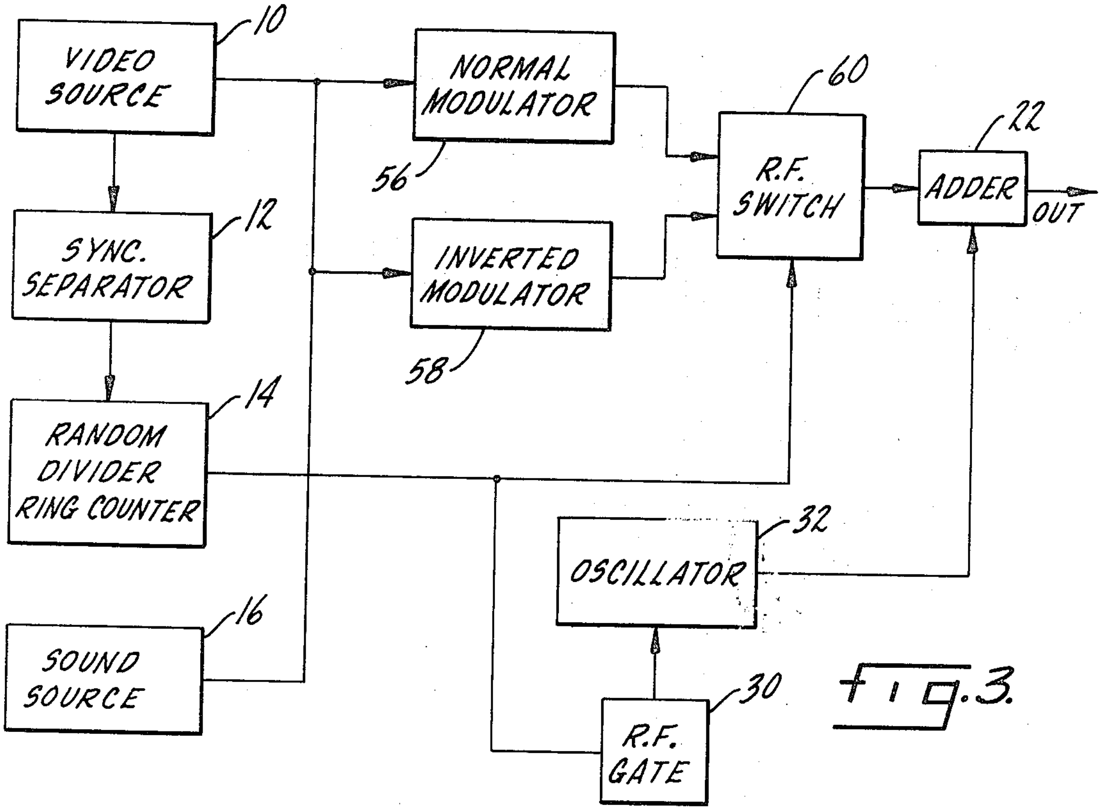
FIG. 3 is a block diagram illustrating a modified form of transmission station.

FIG. 3 illustrates a modified form of arrangement for the transmitting location. The video source, sync separator, random ring counter and sound source have all been given the same numbers as used in connection with the description of FIG. 1. The video source and the sound source are both connected to a normal modulator 56 and an inverted modulator 58. In the normal modulator the audio carrier is at a frequency of 87.25 Mhz and the video carrier is at a frequency of 83.25 Mhz, whereas, in the inverted modulator the video carrier is at a frequency of 87.25 Mhz and the audio carrier is at a frequency of 83.25 Mhz. The outputs from the normal and inverted modulators are both connected to an RF switch 60. The RF gate and switching oscillators 30 and 32 are connected in the same manner as in FIG. 1 to the adder 22. The random ring counter 14 is directly connected to the RF 60.

In operation, the RF switch will alternately select the output of either the normal modulator or the inverted modulator in accordance with the switching pulses received from the ring counter 14. The output from the transmission location of FIG. 3 will be the same as in FIG. 1. There is only a slight difference in the arrangement of the various components.

Whereas the preferred form of the invention has been shown and described herein, it should be realized that there may be many modifications, substitutions and alterations thereto.

The embodiments of the invention in which an exclusive property or privilage is claimed are defined as follows:

1. In a subscription TV system having a central station, a plurality of receivers and a communication link therebetween, means at the central station for sending video and audio signals for a particular TV channel, means at the central station for periodically reversing the audio and video carriers in that channel at multiples of the video vertical sync signals, and means at the central station for sending a switching signal simultaneously with the reversal of the audio and video carriers, said switching signal being transmitted at a frequency within the band width of the particular channel, means at each receiver for receiving the audio and video signals, means at each receiver for receiving the switching signal, and means at each receiver for decoding the reversing audio and video signals in response to the switching signal.

2. The subscription TV system of claim 1 further characterized in that said switching signals are transmitted on a random time basis.

3. The subscription TV system of claim 1 further characterized in that the switching signal is transmitted at a frequency 1 Mhz away from that of the normal video carrier.

4. The subscription TV system of claim 3 further characterized in that the switching signal is at a frequency 1 Mhz below the normal video carrier.

5. The subscription TV system of claim 1 further characterized in that the means at each receiver for decoding the reversing audio and video signals includes a mixer and two oscillators connected thereto, said switching signal controlling which oscillator is connected to the mixer.

* * * * *